US006479597B1

(12) United States Patent
Long et al.

(10) Patent No.: US 6,479,597 B1
(45) Date of Patent: Nov. 12, 2002

(54) RAMAN ANALYSIS SYSTEM FOR OLEFIN POLYMERIZATION CONTROL

(75) Inventors: Robert L. Long, Houston, TX (US); Robert Earl Young, Fountain Valley, CA (US); Paul A. Bartel, Baton Rouge, LA (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 10/138,627

(22) Filed: May 3, 2002

Related U.S. Application Data

(63) Continuation-in-part of application No. 09/627,498, filed on Jul. 28, 2000, now abandoned.
(60) Provisional application No. 60/146,632, filed on Jul. 30, 1999.

(51) Int. Cl.$^7$ .................................................. C08F 2/12
(52) U.S. Cl. .............................. 526/59; 526/60; 526/64; 526/905
(58) Field of Search ............................ 526/59, 60, 64, 526/905

(56) References Cited

U.S. PATENT DOCUMENTS

| | | |
|---|---|---|
| 4,182,810 A | 1/1980 | Wilcox |
| 5,151,474 A | 9/1992 | Lange et al. |
| 5,202,395 A | 4/1993 | Chambon |
| 5,274,056 A | 12/1993 | McDaniel et al. |
| 5,638,172 A | 6/1997 | Alsmeyer et al. |
| 5,678,751 A | 10/1997 | Buchanan et al. |
| 5,682,309 A | 10/1997 | Bartusiak et al. |
| 6,144,897 A | 11/2000 | De Selliers |

FOREIGN PATENT DOCUMENTS

| | | |
|---|---|---|
| WO | WO 94/21962 | 9/1994 |

OTHER PUBLICATIONS

Jorge Jardim Zacca and W. Harmon Ray, "Modelling of the Liquid Phase Polymerization of Olefins in Loop Reactors", *Chemical Engineering Science*, v.48(22)—pp. 3743–3765 (1993).

K. P. J. Williams and N. J. Everall, "Use of Micro Raman Spectroscopy for the Quantitative Determination of Polyethylene Density Using Partial Least–Squares Calibration", *Journal of Raman Spectroscopy*, v.26—(1995), pp. 427–433.

M. L. Myrick, et al., "In Situ Fiber–Optic Raman Spectroscopy of Organic Chemistry in a Supercritical Water Reactor", *Journal of Raman Spectroscopy*, v.25(1)—1994, pp. 59–65.

Edward P. C. Lai and Hassan S. Ghaziaskar, "Noninvasive Spectroscopic Detection of Bulk Polymerization by Stimulated Raman Scattering", *Applied Spectroscopy*, v.48(8)—1994—pp. 1011–1014.

S. E. Nave, "Rugged Fiber Optic Probes and Sampling Systems for Remote Chemical Analysis Via the Raman Technique", *Adv. Instrum. Control*, (1996), v.51(Pt. 1)—pp. 453–467.

Louis P. Russo and Robert E. Young, "Moving–Horizon State Estimation Applied to an Industrial Polymerization Process", *American Control Conference Proceedings*, 1999, San Diego, CA.

Daimay Lin–Vien, et al, "The Handbook of Infrared And Raman Characteristic Frequencies of Organic Molecules", (1991) (Book).

Abstract, "On–Line Raman Analysis of Ethylene and Hexene in the Phillips 1–Hexene and Polyethylene Processes", presentation at the *Gulf Coast Conference*, D. R. Battiste, R. D. Knudsen, B. E. Kreischer, M. P. McDaniel, J. L. Martin, E. A. Benham (Phillips Petroleum), M. E. Womble and T. Deschaines (Raman Systems, Inc.).

*Primary Examiner*—Fred Teskin
(74) *Attorney, Agent, or Firm*—Kevin M. Faulkner; Mandi B. Millbank

(57) ABSTRACT

Method of olefin polymerization in a reactor, such as a slurry loop olefin polymerization reactor, is provided. The method includes conducting in-situ, real time spectroscopic analysis of one or more reactor constituents. The reactor constituents analyzed may be present in the reactor in either the liquid phase or the solid phase, or both. In response to the measured in-situ values, one or more reactor constituents may be metered into the reactor.

19 Claims, 10 Drawing Sheets

HYDROGEN IN POLYPROPYLENE SLURRY EXPERIMENTAL SETUP

Expanded View of Hydrogen Peak Area

Estimated (by press.) Hydrogen Conc. vs. Predicted Hydrogen Conc. for 25% and 35% wt PP Slurry

Expanded Spectra of acetonitrile in pentane, showing impact of polymer on peak size

Raman Spectrum of Polypropylene Granules

Ethylene Concentration by Raw Peak Height at 1618/cm

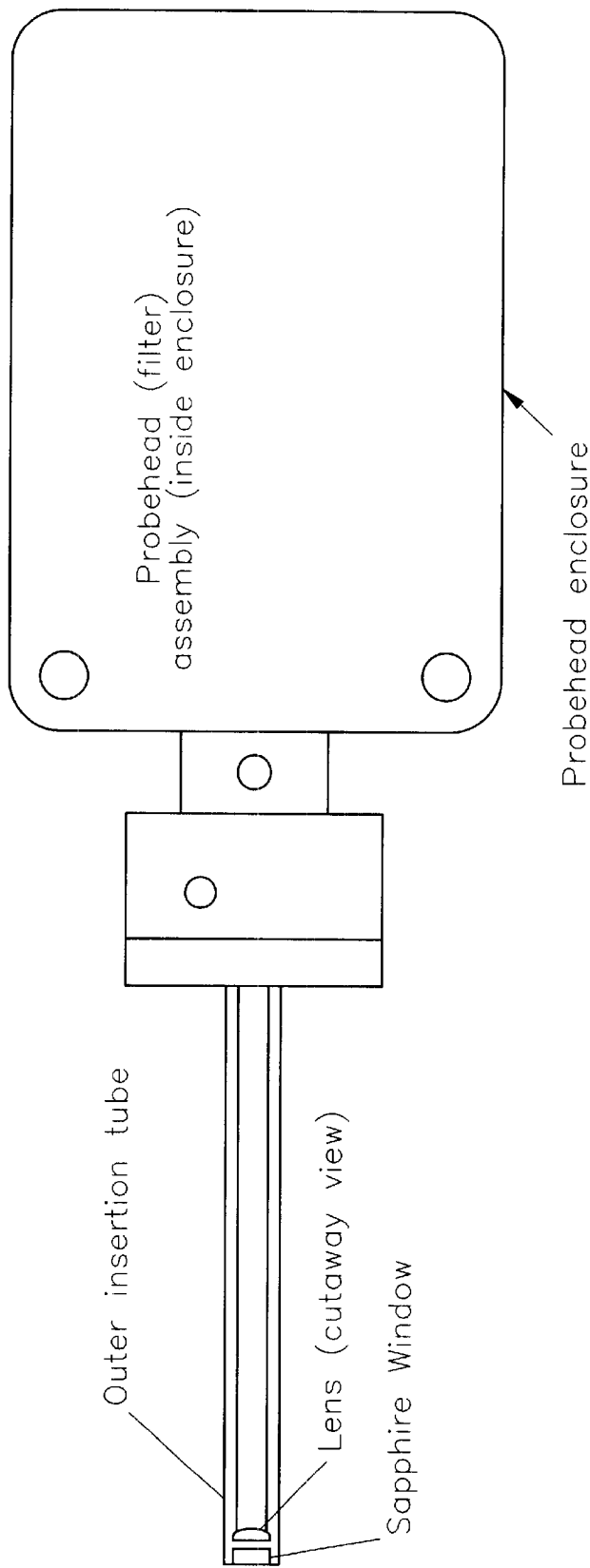
Fig. 16  Imaging Probe Assembly

RAMAN ANALYSIS SYSTEM FOR OLEFIN POLYMERIZATION CONTROL

CROSS-REFERENCE TO RELATED APPLICATIONS

This application is a Continuation-in-part of U.S. patent application No. 09/627,498 filed Jul. 28, 2000, now abandoned, which claims priority to U.S. Provisional Patent Application No. 60/146,632 filed Jul. 30, 1999, the entire disclosures of which are incorporated herein by reference.

FIELD OF INVENTION

This invention relates to spectroscopic in-situ analysis of constituents in a chemical reaction. More particularly, this invention relates to spectroscopic insitu analysis of constituents in a slurry loop polymerization reactor.

BACKGROUND OF THE INVENTION

Spectroscopic analysis is a branch of analytical chemistry devoted to identification of elements and elucidation of atomic and molecular structure. Generally, the identification of elements and elucidation of atomic and molecular structure is accomplished by illuminating or irradiating the substance under examination and then measuring the radiant energy absorbed or emitted by the substance. The energy absorbed or emitted may be in any of the wavelengths of the electromagnetic spectrum. By comparing and/or correlating the measured wavelengths absorbed or emitted by the sample with wavelengths emitted or absorbed from known elements or molecules, information about a sample may be determined.

More particularly, spectroscopic analysis generally requires isolating a portion of the substance under investigation. The isolated portion is then prepared for illuminating or irradiating by an energy source. After irradiation, the energy absorbed or emitted by the isolated portion is measured and correlated to values derived from known materials measured under similar conditions.

Spectroscopic analysis is a common tool used in laboratories and industrial processes. Its uses include determining the molecular identity and properties of a chemical composition as well as monitoring the progress of a reaction. Whether conducting a laboratory exercise or industrial process, this type of information is desirable. This is so because, for example, data derived from spectroscopic analysis may be used to identify the final product of these reactions and determine the consumption and/or identity of intermediates produced at selected stages in a multistage process.

For industrial processes and particularly industrial chemical reactions, in-situ identification and monitoring of (i) the reaction constituents, (ii) the reaction intermediates, (iii) the consumption rate of the starting materials, and (iv) the final product are desirable. In-situ analysis is desirable generally because the analysis environment is the reaction environment within the reaction vessel. In this way, the isolation and preparation of a portion of the substance under investigation prior to irradiation is avoided. And still more desirable is the acquisition and assimilation of analysis information after the passage of a relatively short period of time from the moment the analysis process is initiated, otherwise referred to as "real time analysis".

However, there remain many industrial processes, and particularly industrial chemical reaction environments, for which spectroscopic analysis techniques do not offer an investigator the option of conducting reliable, in-situ, real time analysis. As such, there exists a need for further development in the field of in-situ, real time spectroscopic analysis and the application thereof in industrial processes.

SUMMARY OF THE INVENTION

The present invention provides both apparatus and methods for conducting in-situ, real time spectroscopic analysis of one or more reaction constituents present in a reactor, particularly a slurry olefin polymerization reactor and more particularly, a slurry loop olefin polymerization reactor. Examples of reaction constituents include polymerized and polymerizable olefins. Examples of polymerized olefins include, but are not limited to polypropylene, polyethylene, polyisobutylene, and homopolymers and copolymers thereof. Other examples of reactor constituents include, but are not limited to hydrogen, propane, ethane, butane monomers, and comonomers. Examples of monomers and comonomers include, but are not limited to ethylene, propylene, butene, hexene, octene, isobutylene, styrene, norbornene and the like.

Without limiting the present invention to any particular spectroscopic analysis technique, the inventors have observed in a slurry reaction environment a correlation between in-situ collected Raman spectra (a product of Raman spectroscopy) from the liquid phase of the reaction environment and the concentration of at least one reactor constituent. Furthermore, the inventors have discovered that this correlation, in combination with in-situ, real time analysis of at least one reactor constituent in such a reactor will allow for improved control of the final product properties, such as melt flow rate. Improved control of the final product properties is achieved by metering the flow of at least one reactor constituent into the slurry reactor in response to the in-situ measured concentration of at least one reactor constituent.

In one embodiment, a method of olefin polymerization in a reactor having reactor constituents in a liquid phase is provided. The method steps include measuring in-situ a first reactor constituent and metering the flow of a second reactor constituent into the reactor in response to the measuring step. The first and second reactor constituents may be the same constituent or they may be different constituents.

In another embodiment, another method of olefin polymerization in a multi-phase reactor containing reactor constituents is provided. The method steps include irradiating in-situ the reactor constituents, measuring scattered or reflected energy from the irradiated reactor constituents, determining from the measured scattered or reflected energy a concentration of at least one reactor constituent, and metering the flow of at least one reactor constituent into the reactor in response to the determining step.

In another embodiment, a method of olefin polymerization in a reactor containing reactor constituents in a liquid phase is provided. These method steps include irradiating in-situ the liquid phase, measuring the frequencies scattered or reflected by the irradiated liquid phase, correlating at least one measured frequency with the concentration of a first reactor constituent, and metering, in response to the correlating step, a flow of the first reactor constituent into the reactor.

In another embodiment, another method of producing a polyolefin in a reactor containing reactor constituents in a liquid phase is provided. These method steps include irradiating in-situ the liquid phase, measuring the frequencies scattered by the irradiated liquid phase, determining from the measured frequencies a concentration of one or more reactor constituents, comparing the concentration of one or more reactor constituents with one or more values that correlate to one or more selected physical properties of the polyolefin, and metering, in response to the correlating step, the flow of one or more reactor constituents into the reactor. One of the selected physical properties of the polyolefin may be melt flow rate. Additionally, the metered flow of one or more reactor constituents into the reactor may be controlled such that the polyolefin produced may be defined, in part, by a melt flow rate value within a selected melt flow rate range.

In another embodiment, a method of olefin polymerization in a slurry reactor containing reactor constituents, including hydrogen, in a liquid phase is provided. These method steps include, irradiating in-situ the liquid phase, measuring the frequency scattered or reflected by the hydrogen in the liquid phase, determining the concentration of hydrogen in the liquid phase from the measured frequency, and metering, in response to the concentration of hydrogen measured, the flow of the hydrogen into the reactor.

BRIEF DESCRIPTION OF THE DRAWINGS

FIG. 5b is an expanded view of a portion of the spectra of FIG. 5a.

FIG. 16 is a schematic illustration of an imaging probe assembly.

DETAILED DESCRIPTION OF THE INVENTION

Figure 1:
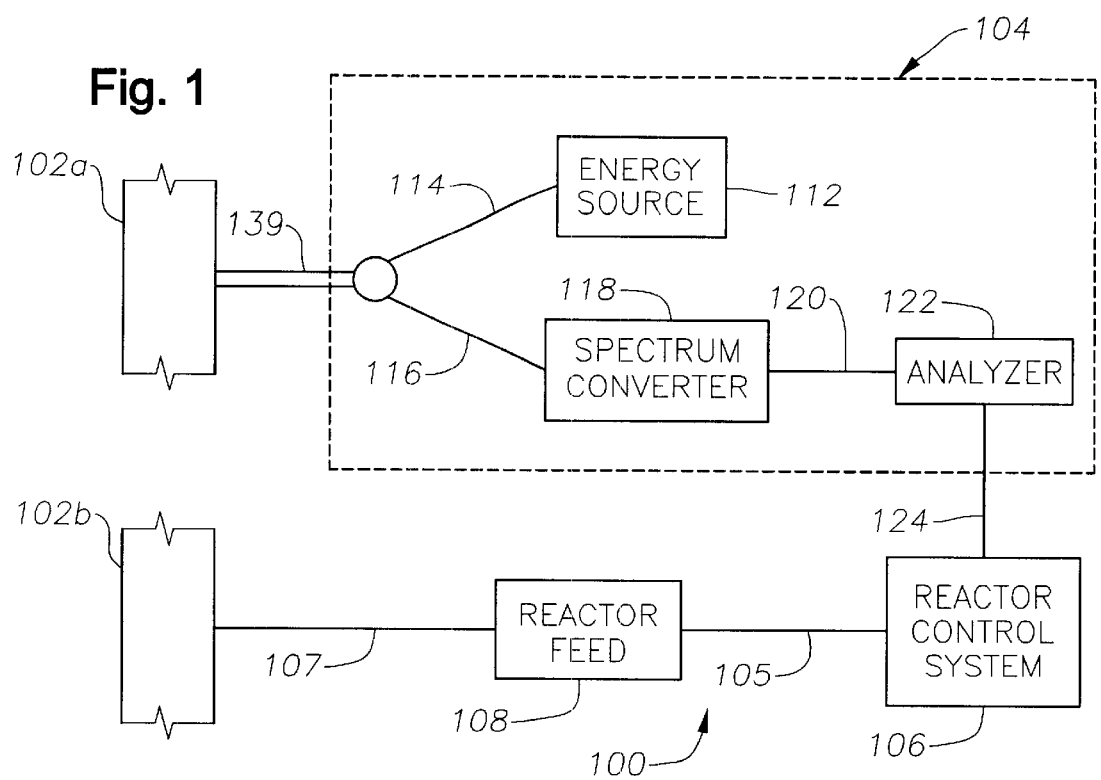
FIG. 1 is a block diagram of a slurry loop reactor plant schematically illustrating an in-situ Raman spectroscopic system and data feed from the same into the slurry loop reactor plant control system.

The present invention provides both apparatus and methods for conducting in-situ, real time spectroscopic analysis of one or more reactor constituents present in a reactor, particularly a slurry olefin polymerization reactor and more particularly, a slurry loop olefin polymerization reactor. Examples of reaction constituents include, but are not limited to polymerized and polymerizable olefins. Generally, polymerizable olefins include, but are not limited to $C_2$, $C_3$–$C_{20}$, alpha olefins, $C_4$–$C_{20}$ diolefins, $C_5$–$C_{20}$ cyclic olefins, $C_7$–$C_{20}$ vinyl aromatic monomers and $C_4$–$C_{20}$ geminally disubstituted olefins. More specific examples of polymerizable olefins include, but are not limited to propylene, ethylene, 1-butene, 1-hexene, 1-octene, isobutylene, 1,4-hexadiene, dicyclopentadiene, norbornene, ethylidene norbornene, vinyl norbornene and styrene, and products thereof, such as polyolefin copolymer elastomers and engineering olefin copolymers.

A slurry loop olefin polymerization reactor can generally be described as a loop-shaped continuous tube. In some instances, the reactor design may be generally "O" shaped. One or more fluid circulating devices, such as an axial pump, urge the reactor constituents within the tube in a desired direction so as to create a circulating current or flow of the reactor constituents within the tube. Desirably, the fluid circulating devices are designed to provide high velocity of motion and a very intensive and well-defined mixing pattern of the reactor constituents. The reactor may be totally or partially jacketed with cooling water in order to remove heat generated by polymer polymerization.

In the slurry loop olefin polymerization reactor, the polymerization medium may include reactor constituents, such as a liquid monomer, like propylene and/or a hydrocarbon solvent or diluent, advantageously aliphatic paraffin such as propane, isobutane, hexane, heptane, cyclohexane and/or an aromatic diluent such as toluene. The polymerization temperatures may be those considered low, e.g., less than 50° C., desirably 0° C.–30° C., or may be in a higher range, such as up to about 150° C., desirably from about 50° C. up to about 80° C., or at any range between the end points indicated. Pressures can vary from about 100 to about 700 psia (0.69–4.8 MPa). Additional description is given in U.S. Pat. Nos. 5,274,056 and 4,182,810 and WO 94/21962 which are each fully incorporated by reference. As such, the reactor constituents generally are a combination of both solids, such as for example catalysts, catalyst supports, polymerized olefins, and the like as understood by those skilled in the art and liquids, such as those described above. The percentage of solids within the reactor constituents may be as high as 60 weight percent (wt %) of the reactor constituents. Desirably, the weight percent of solids is in the range of 45 wt % to 50 wt %.

The slurry loop olefin polymerization reactor may be operated in a single stage process or in multistage processes. In multistage processing, the polymerization of olefins is carried out in two or more reactors. These reactors may be configured in series or in parallel or a combination thereof. Examples of other olefin polymerization reactors suitable for multistage processing with slurry loop olefin polymerization reactors include slurry and slurry loop olefin polymerization reactors, gas phase olefin polymerization reactors, and other moving-bed, fixed-bed, or fluid-bed reactors.

Without limiting the present invention to any particular spectroscopic analysis technique, the present invention employs Raman spectroscopic techniques to determine the in-situ concentration of at least one reactor constituent, such as for example, hydrogen and desirably dissolved hydrogen present in the liquid phase. Examples of other measurable reactor constituents include, but are not limited to diluents, monomers, comonomers, the identity of reaction intermediates, and final polymer properties, such as melt flow rate, comonomer content, crystallinity, melt index, viscosity index, polymer melt viscosity, density and percent unsaturation, and the like.

Raman spectroscopy analysis begins by irradiating a material under investigation with energy, such as electromagnetic energy for example in the visible or near infrared wavelength regions. The radiation is scattered upon impact with the material. The scattered radiation may be classified as elastically scattered and inelastically scattered radiation. The inelastically scattered radiation is referred to as Raman scatter. The wavelengths and intensities of the Raman scatter make up the Raman spectrum. It is the Raman spectrum that provides chemical, structural and other information about the irradiated material.

The present invention utilizes data derived from in-situ Raman sampling of reactor constituents in the liquid phase of a slurry olefin polymerization reactor. Such data includes properties and concentrations of reactor constituents. This data is used to control the polymerization reaction and final polymer product properties, such as melt flow rate, comonomer content, and the like. The polymerization reaction control is achieved, for example, by metering the flow of reactor constituents into the reactor in response to the Raman sampling data.

These and other details of the present invention will be more fully described by reference to the accompanying Figures and the following discussion.

Turning now to FIG. 1, a slurry loop reactor plant 100 is schematically illustrated. The slurry loop reactor plant 100 includes a slurry loop reactor vessel, portions of which are designated by reference numbers 102a and 102b, an analyzer system 104, a reactor control system 106 and a reactor constituent feed source 108. An example of a suitable reactor control system 106 is more fully described in U.S. Pat. No. 5,682,309 which is incorporated by reference herein in its entirety.

Briefly, the reactor control system 106 controls the slurry loop reactor plant processes. These processes include (i) manipulated variables, such as for example, hydrogen feed flow rate, total feed rate and catalyst flow rate and (ii) control variables, such as, for example, melt flow ratio, ethylene content, and product rate. The reactor control system 106 includes a processor, sensors and sensor circuitry (not shown). The sensors and sensor circuitry provide data, such as measures of the control variables. The processor provides memory for storing data, such as correction time constants, upper and lower limits for control variables and generates signals responsive to sensor data and limits data. Such signals generated by the reactor control system 106 and conveyed by conduit 105 to the reactor constituent feed source 108 can influence the metering of reactor constituents from the reactor constituent feed source 108 through conduit 107 and into the slurry loop reactor vessel 102b.

The analyzer system 104 includes an in-situ probe 139, such as a fiber optic probe, secured to the reactor vessel 102a, a radiation source 112, such as a laser, connected to the probe 139 by a conduit 114, such as a fiber optic cable. Another conduit 116, such as a fiber optic cable, connects the probe 139 to a spectrum converter 118, such as a Raman spectrum converter. The spectrum converter 118 is connected via conduit 120 to an analyzer 122, such as a Raman analyzer. The analyzer 122 is connected via conduit 124 to the reactor control system 106.

The probe 139 includes a center radiation transmission conduit (not shown), such as a fiber optic cable, for conducting radiation energy from the radiation source 112 into the reactor vessel 102 and ultimately for irradiating one or more reactor constituents. Surrounding the center conduit is a plurality of receiving conduits (not shown), such as a plurality of fiber optic cables, for receiving radiation scattered by at least one of the irradiated reactor constituents. The receiving conduits also convey the scattered radiation to the spectrum converter 118.

In the operation of the present invention, laser light from irradiation source 112 is delivered via an optical fiber within conduit 114 to an optical fiber within the center radiation transmission conduit which is in communication with the reactor constituents. Irradiation of the reactor constituents generates scattered radiation, a portion of which is collected by one or more optical fibers that form the receiving conduits. The collected scattered radiation is conveyed from the receiving conduits to the spectrum converter 118 by one or more optical fibers within conduit 116. In the spectrum converter 118, the scattered radiation is filtered by a holographic notch filter to remove unshifted radiation. A CCD (Charged Couple Device) camera records radiation intensity over a range of selected wavelengths. The selection of wavelengths is dependent, in part, on the wavelength of the laser light irradiating the reactor constituents and the reactor constituents being investigated. The analyzer 122 receives the wavelength data from the spectrum converter 118 via conduit 120. The analyzer may be preprogrammed to examine selected wavelengths corresponding to reactor constituents that the reactor operator may desire to monitor and/or examine. For example, the wavelength shift of 4140 $cm^{-1}$ corresponds to the dissolved hydrogen in the slurry loop reactor vessel 102. The wavelength shifts for other reactor constituents may be found in "The Handbook of Infrared And Raman Characteristic Frequencies of Organic Molecules," Daimay Lin-Vien, et al, (1991). The recorded intensities may be plotted as peaks of varying heights as a function of wavelength. Information, such as the concentration of the reactor constituent, may be estimated by calculating the area under or the height of one or more of the associated peaks. Alternatively, multivariate statistical methods, such as principle component regression or partial-least squares regressions can also be used to correlate the concentration of the reactor constituents or polymer properties to the spectral intensities. The above described irradiation/analysis cycle may be repeated between every 5 seconds to 1,000 seconds or as otherwise desired.

Data from the analyzer 122, such as the concentration of hydrogen in the liquid phase (which may also be referred to as the "dissolved hydrogen concentration"), may be conveyed via conduit 124 to the reactor control system 106. As previously described, the processor in the control system 106 can compare the preset upper and lower limits for reactor constituent concentrations and the flow of these reactor constituents into the reactor vessel 102 with the data from the analyzer 122 and adjust or meter the flow thereof accordingly.

For example, in the case of an olefin slurry loop polymerization reactor, hydrogen can serve as a polymer chain transfer agent. In this way, the molecular weight of the polymer product can be controlled. Additionally, varying the hydrogen concentration in olefin polymerization reactors can also vary the polymer melt flow rate (MFR). In some instances, customers may specify a very narrow polymer MFR range for their product(s). The present invention allows the polymer manufacture to produce polymer having a selected MFR range. This is accomplished by knowing the relationship between hydrogen concentration and the MFR of polymers produced by a specific reactor and programming the target MFR or MFR range into the control system 106 processor. By monitoring the hydrogen concentration data generated by the analyzer system 104 and comparing this data to the upper and lower limits of the target MFR range, the flow of hydrogen into the reactor vessel 102 may be metered so that the MFR range of the polymer product may remain compliant with the target MFR range.

While the above example is specific to hydrogen concentration and polymer MFR, it will be understood by those skilled in the art that other reactor constituent properties and reactor constituent concentrations measured in the reactor vessel may also be correlated to final polymer properties. In a similar way as described above, the final polymer properties may be achieved by controlled metering of these reactor constituents into the reactor vessel 102 in response to data generated by the analyzer system 104 in concert with an appropriately programmed processor (programs which are readily available or which are known to or can be created by those skilled in the art). For example, in the article titled, "Modelling Of The Liquid Phase Polymerization Of Olefins In Loop Reactors" by Zacca and Ray which appears in *Chemical Engineering Science,* Vol. 48, No. 22, page 3743, and the article entitled "Moving-Horizon State Estimation Applied to an Industrial Polymerization Process" by Louis P. Russo and Robert E. Young which appears in the *American Control Conference Proceedings,* 1999, San Diego, Calif., both of which are incorporated by reference herein in their entirety, mathematical models are provided for describing the dynamics of the polymerization of olefins in a slurry loop reactor. One skilled in the art will recognize that the teachings in these articles are not catalyst specific and are applicable for use with the present invention as well as for use in describing and/or understanding the dynamics of a slurry loop reactor employing, for example, one or more metallocene catalysts systems.

Figure 2:
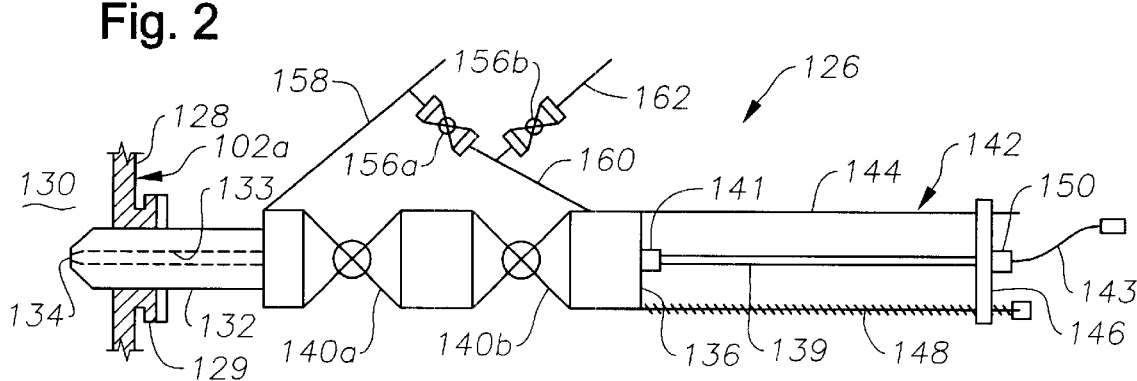
FIG. 2 is a schematic view of the fiber optic probe assembly.
Figure 3:
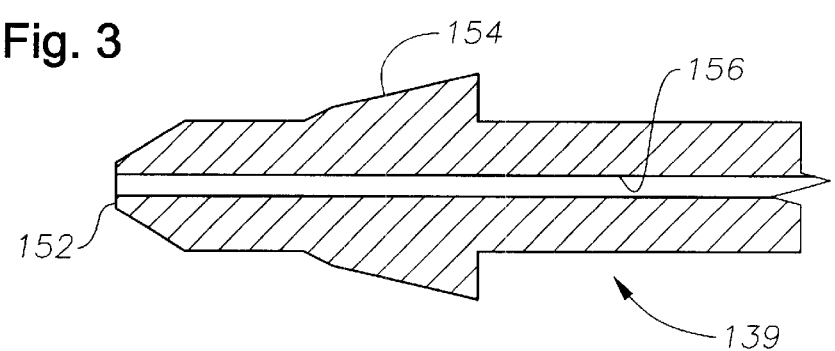
FIG. 3 is an enlarged, fragmented, cross sectional view of a fiber optic probe tip.

Turning now to FIG. 2, a fiber optic probe assembly 126 secured to the reactor vessel wall 128 by engaging flanges 129 is illustrated. The fiber optic probe assembly 126 extends for a distance into the interior 130 of the reactor vessel 102a. The fiber optic probe assembly 126 includes a probe housing 132 having a first end 134 and second end 136 and portions defining a probe channel 133 (illustrated in ghost) sized for slidably receiving a probe 139, desirably formed from stainless steel. The probe 139 includes a fiber optic channel 156 (FIG. 3) sized for receiving the center fiber optic transmission conduit and the fiber optic receiving conduits described above. The transmission and receiving fiber optic conduits are generically illustrated in FIG. 2 by the structure identified by the reference number 143. The center fiber optic transmission conduit and the fiber optic receiving conduits 143 terminate at the probe tip 152 (FIG. 3). The probe channel 133 extends substantially the length of the probe housing 132 between the first and second ends 134 and 136, respectively. Between the first and second ends 134 and 136, respectively, a pair of ball valves 140a and 140b are secured to the probe housing 132 and are aligned with the probe channel 133. The probe 139 enters the probe housing 132 through a re-sealable fitting 141. The probe 139 may be extended, retracted or selectively positioned within the probe channel 133 by a probe insertion assembly 142.

The probe insertion assembly 142 is secured to the second end 136 of the probe housing 132. The probe insertion assembly 142 includes a guide rod 144, a plate 146 moveably secured to the guide rod 144 and to a threaded rod 148 for selectively positioning and securing the plate 146 along the length of the guide rod 144. A connection 150 secures one end of the probe 139 to the plate 146.

While the analyzer system 104 does not require continuous and/or simultaneous correlation or calibration of the reactor constituent data with data obtained from an irradiated reference material, calibration of the analyzer system, from time to time, may be desirable. Calibration of the analyzer system 104 may be performed by positioning the probe tip 152 (FIG. 3) between ball valve 140b and the second end 136 of the probe housing 132. In this way, the ball valves 140a and 140b may be rotated to interrupt contact between the reactor constituents and the irradiating and collecting ends of the transmission and receiving conduits 143. The ball valves 156a and 156b may be rotated to isolate a flow of purging fluid, such as liquid propylene, in a conduit 158 from entering a calibration material conduit 160. The calibration material conduit 160 communicates with a calibration material source 162 and a portion of the probe channel 133 that is defined by the portion of the probe housing 132 between the ball valve 140b and the second end 136. In this way, a reference material may be segregated from the reactor constituents when the analyzer system 104 is being calibrated or its accuracy checked.

Calibrating the analyzer system 104 may be performed by contacting the irradiating and collecting ends of the transmission and receiving conduits 143 at the probe tip 152 (FIG. 3) with a quantity of the reference material. The reference material is irradiated and the energy scattered by the reference material is collected. The reference material data is processed in the same manner as the reactor constituent data except that the reference data obtained during calibration is compared to known data for the reference material.

Selection of the reference material for calibration may, in some instances, depend upon the reactor constituent(s) being investigated and/or monitored. For example, as described above, when monitoring the concentration of hydrogen in the reactor vessel for purposes of controlling the MFR of polymer product, it may be desirable to select reactor grade hydrogen as one of the reference materials to calibrate the analyzer system 104.

Referring now to FIG. 3, an enlarged view of a portion of the probe 139 which rests in the probe channel 133 adjacent the first end 134 is illustrated. Slightly rearward of the probe tip 152 in a direction towards the second end 136 (not shown), the cross sectional area of the probe 139 increases in a flared section 154. The flared section 154 facilitates the sealing of the probe 139 within the probe channel 133. The fiber optic channel 156 extends the length of the probe 139 and is sized for receiving the fiber optic transmitting and receiving conduits 143.

When the analyzer system 104 is used for investigating and/or monitoring the concentration of hydrogen in a slurry loop, propylene polymerization reactor, specific, non-limiting examples of suitable analyzer system components include: a Kaiser HoloProbe Process Raman Analyzer, manufactured by Kaiser Optical Systems, Inc. of Ann Arbor, Mich., a Visible 400 mW, 532 nm solid state Diode-pumped frequency YAG laser, manufactured by Coherent, Inc. and supplied by Kaiser Optical Systems, and a Visionex Captron Probe, manufactured by Visionex, Atlanta Ga.

Additionally, it is desirable, but not necessary, that the fiber optic probe assembly 126 meet the following minimum particular specifications: operating conditions of 600 psig (41.36 bars) and 165° F. (73.9° C.), design conditions of 700 psig (48.25 bars) and temperatures in the range of from −49° F. (35° C.) to 302° F. (150° C.). Furthermore, it is desirable that the optic probe assembly 126, including fiber optics, epoxy and related components, sustain without loss of integrity: (i) exposure to light hydrocarbons and TEAL (($C_2H_5$)$_3$Al) at concentrations in the range of from 0.01 to 500 ppm; (ii) thermal cycling from 0° C. to 100° C. over a one hour period. It is also desirable that the fiber optic cables (the transmission conduit and the receiving conduits) be secured within and throughout the length of the probe 139.

The above description illustrates the use of an analyzer system employing a single probe for analyzing one or more reactor constituents. It will be understood by those skilled in the art that the analyzer system may be configured to include more than one probe which may be located at one or more locations along the reactor vessel. Additionally, in the case of multistage reactors, the analyzer system may be configured to include probes located at one or more locations along one or more reactors. In this way, one or more reactor constituents may be analyzed at one or more locations within the overall process and particularly, the overall olefin polymerization process.

EXAMPLES

The following examples are presented to illustrate the foregoing discussion. Although the examples may be directed to certain embodiments of the present invention, they are not to be viewed as limiting the invention in any specific respect. The equipment used and the experimental procedure employed to obtain the data in the following tables and figures are outlined below.

Equipment

Figure 4:
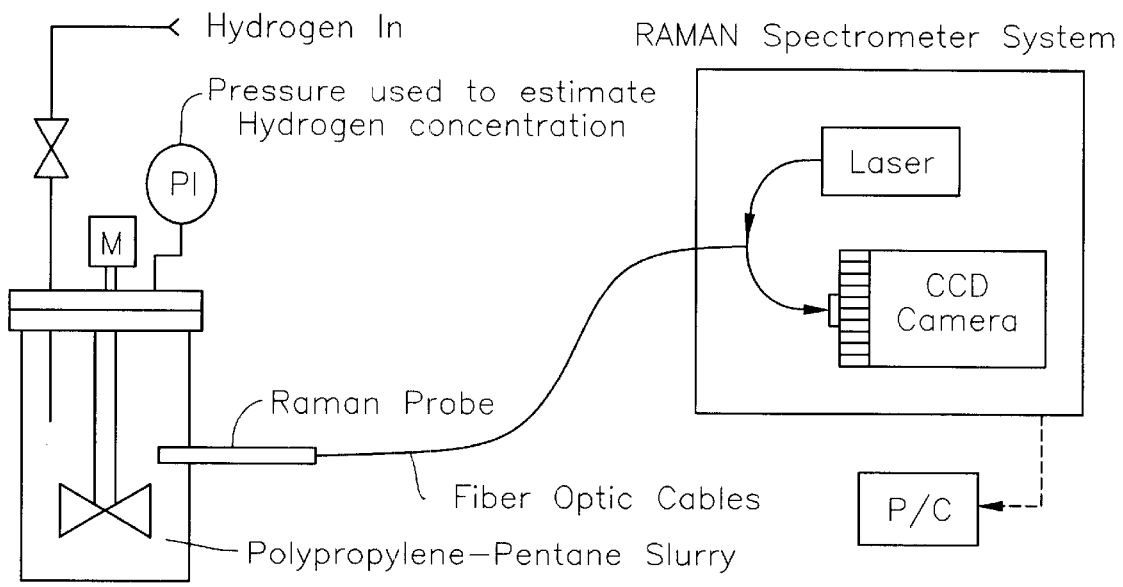
FIG. 4 is a schematic illustration of a laboratory slurry reactor.

The apparatus used in the hydrogen concentration and polymer properties experiments is schematically illustrated in FIG. 4. The equipment consisted of the following major components:

- A Kaiser Holoprobe 532 Raman Spectrometer
- A 200 mW 532 nm Solid State YAG Laser
- Visionex Captron Probe with integral 532 nm notch filter
- Low-Hydroxyl Silica Fiber Optic Cables
- A Gateway GS-400 Computer used to control spectrometer and record spectra.
- Stirred Vessel with Pressure Measurement/Control Experimental Procedure The hydrogen concentration experiment was designed to provide a simulation of slurry loop reactor conditions. Pentane was substituted for propylene because of simpler handling requirements. Hydrogen concentration experiments were conducted in order to determine the sensitivity level of the hydrogen measurement. The polymer properties experiment simply consisted of acquiring Raman spectra of polypropylene granules. They are described in more detail below.

Weighed amounts of polypropylene granules and pentane were added to the vessel to create a slurry of known concentration. The vessel was then sealed, purged with nitrogen, and agitation was established. Hydrogen was then added to the system to achieve desired system pressure. At each pressure level, Raman spectra were collected and recorded in a manner similar as described above. The system pressure was used to estimate hydrogen concentration. This was repeated for several slurry concentration levels.

The polymer property experiment utilized the Raman probe, spectrometer and related equipment, but consisted of simply placing the Raman probe in a plastic bag containing polypropylene granules and acquiring spectra.

Example 1

Hydrogen Concentration

Figure 5A:
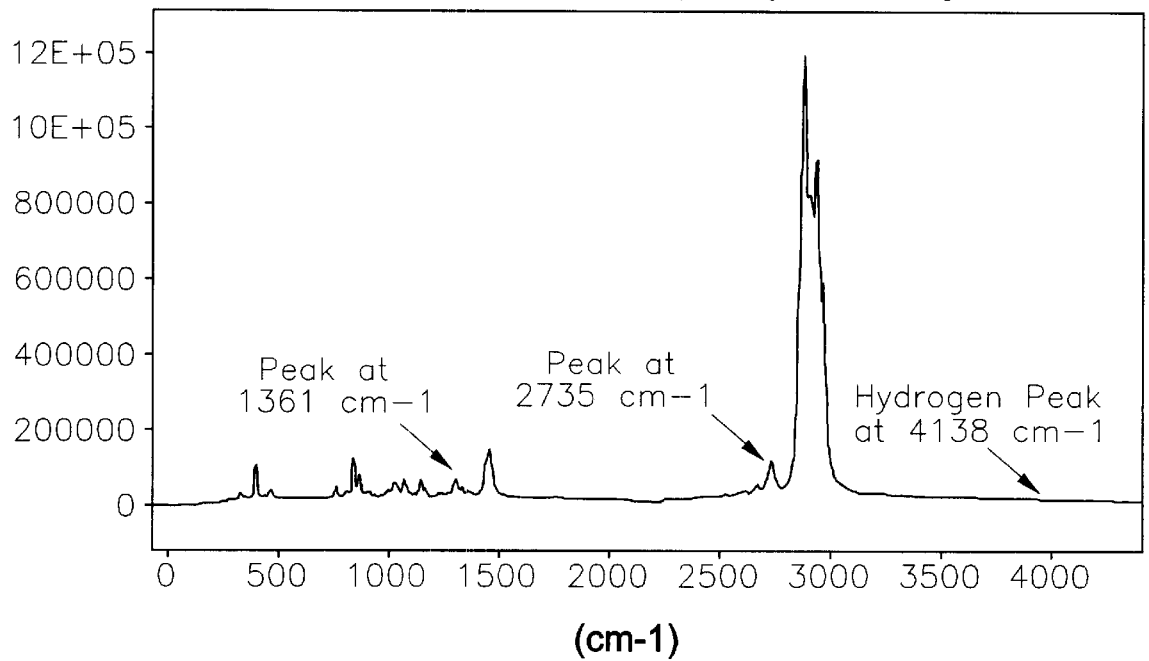
FIG. 5a is an illustration of Raman spectra of a pentane/polypropylene slurry.
Figure 5B:
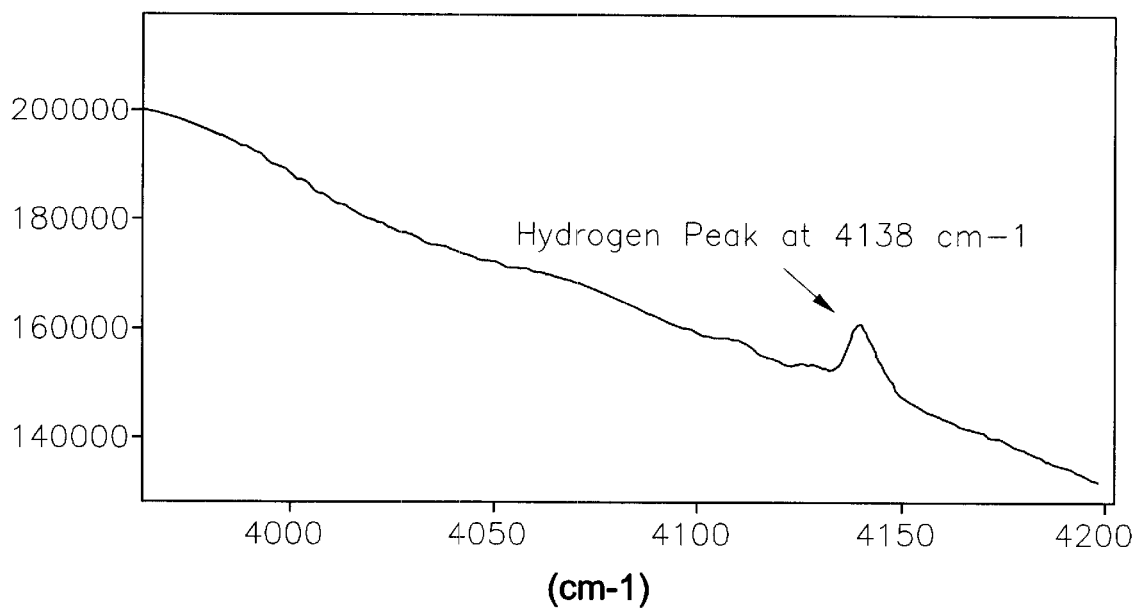

Hydrogen exhibits a peak at a Raman shift of 4140 cm$^{-1}$. This hydrogen peak along with two peaks from the pentane solvent (at 1361 cm$^{-1}$ and 2735 cm$^{-1}$) were used for the hydrogen concentration measurement. These are shown in FIGS. 5a and 5b.

The pentane peaks were used in order to establish the hydrogen measurement as a ratio against other major components. This method provides a means of correcting the hydrogen prediction for changes in scattering intensity caused for example, by changing polymer concentration. Desirably, in polyolefin field reactors, measurement of hydrogen will also use one or more bands from the monomer and polymer. The area under each band (or peak) was integrated using Grams 32 data analysis software. The peak areas were used to develop a hydrogen concentration prediction equation of the form:

$$H_2 \text{ (ppm)} = a_1 * A_{4138} + a_2 * (A_{4138}/A_{1361}) + a_3 * (A_{4138}/A_{2735}) + C$$

where:

$A_n$ are the Peak Areas $a_1 \ldots a_3$ are the regression coefficients

C is a constant

Figure 6:
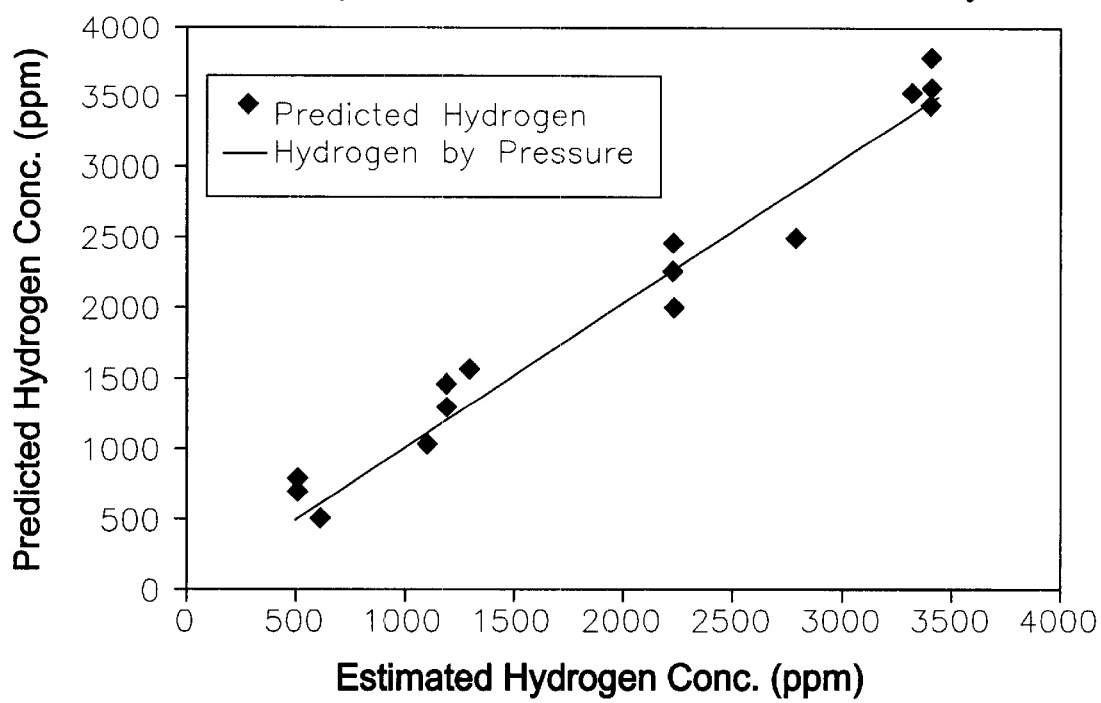
FIG. 6 is a plot of hydrogen pressure vs. hydrogen prediction by Raman.

A plot of estimated hydrogen concentration versus Raman predicted hydrogen is shown in FIG. 6.

Example 2

Hydrogen Measurement Sensitivity

The determination of hydrogen measurement sensitivity was conducted using a certified blend of hydrogen in propylene liquid. Several Raman spectra were collected, and the repeatability of the analysis was used to establish the lower limit of hydrogen measurement sensitivity. This value is assumed to be the upper level of sensitivity to hydrogen as the presence of polymer granules will have a negative impact on the measurement. The impact of polymer granules on sensitivity to hydrogen was evaluated by observing the impact on a surrogate compound (acetonitrile) in a pentane/polypropylene slurry. A surrogate in pentane was used to simplify handling in the laboratory. It is believed that the results for hydrogen in propylene will be similar. The calculations are shown below:

Calculation of Measurement Sensitivity/Repeatability

Table 1 reports the result from 240 parts per million ("ppm") hydrogen in propylene repeatability test.

TABLE 1

| No. | Peak Ht. |
| --- | --- |
| 1 | 101.05 |
| 2 | 103.39 |
| 3 | 108.54 |
| 4 | 110.18 |
| 5 | 112.24 |
| 6 | 114.84 |
| 7 | 108.46 |
| Avg. | 108.39 |
| Stdev. | 4.81 |

An estimate of the repeatability in ppm $H_2$ (also the standard deviation in ppm of $H_2$) of the instrument can be made using the standard deviation of the seven sequential measurements.

Repeatability (ppm $H_2$) = (4.81/108.39) × 240 ppm = 10.6 ppm $H_2$

The minimum detectable limit can be estimated at three times the standard deviation in ppm of $H_2$ of the measurement.

Minimum Detectable=~3×Std. Dev. in ppm of $H_2$

Figure 7:
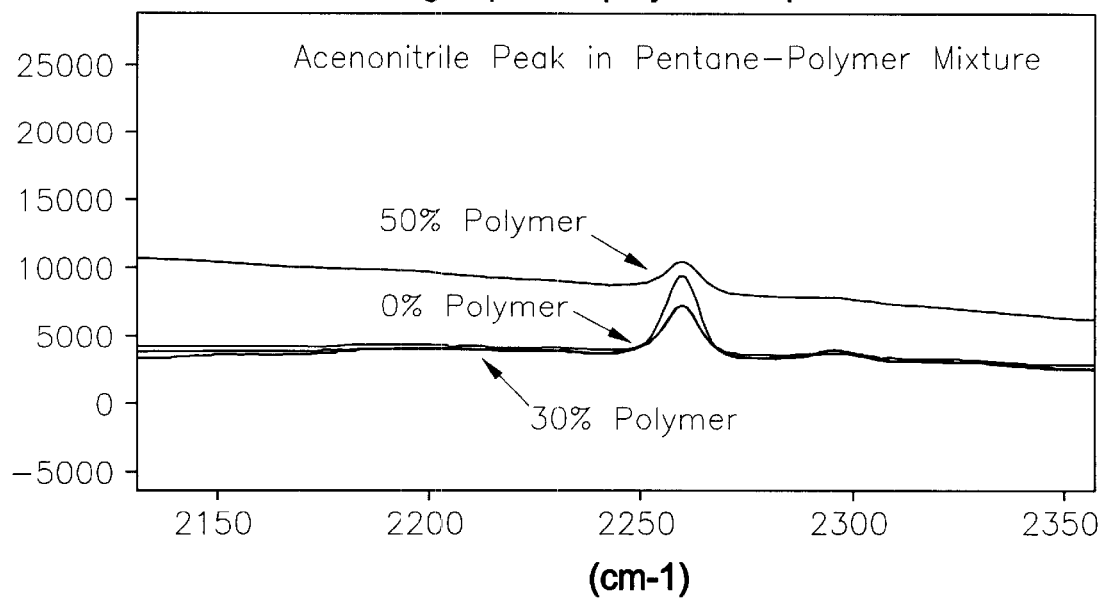
FIG. 7 is an expanded Raman spectra of acetonitrile in pentane.

As such, the minimum detectable limit in propylene liquid using the above equipment configuration equals approximately 33 ppm $H_2$ Impact of Polymer Slurry on H2 Measurement Sensitivity/Repeatability FIG. 7 illustrates the expanded spectra of acetonitrile in a polypropylene/pentane slurry at several polymer concentrations. As can be seen from FIG. 7 above, the acetonitrile peak at 50% polypropylene slurry is approximately 50% the size of the peak with no polymer present. Assuming that a 50% slurry similarly depresses the hydrogen peak size by 50%, then the estimated hydrogen sensitivity is as follows:

Taken from above that hydrogen measurement repeatability/sensitivity in propylene liquid is 10.6/33 ppm $H_2$, then:

$H_2$ Repeatability (at 50% polymer)=10.6 ppm/0.5=22 ppm $H_2$ $H_2$ Sensitivity (at 50% polymer)=33 ppm/0.5=66 ppm $H_2$

Example 3
Polymer Properties Measurement

The measurement of polypropylene properties such as MFR was based on the correlation of Raman spectra collected from polypropylenes with known (as determined by a primary method such as NMR or a Rheometer) properties.

Spectral Modeling for MFR

Each individual spectra taken is represented by an array of approximately 4400 frequency vs. intensity values. (1 row with 4400 columns). For a model set with 20 samples, this produces a data array with a dimension of 20 rows by 4400 columns.

To successfully produce a prediction model from this data array, it is necessary to first reduce the size of the data set. This was accomplished using Principal Components Analysis (PCA). PCA reduces this large data set to a number of covariant orthogonal vectors referred to as Principal Components or PCs. Each PC contains the covariant (correlated) data contained in the data set. The first PC represents the highest valued covariant behavior, with each PC in descending order representing lower intensity (intensity value) information.

Each spectra is then assigned a "score" for each PC. The score is the amount of each principal component found in the spectra. The scores represent the independent variables that are regressed against properties of interest in order to produce a prediction model. The regression of the scores produced a "regression vector" with a coefficient for each intensity value utilized.

The form of the predictive equation is:

predicted value=$k_{\lambda_1}A_{\lambda_1}+k_{\lambda_2}A_{\lambda_2} \ldots +k_{\lambda_n}A_{\lambda_n}$ where:

$A_{\lambda_n}$ is the absorbance at the $n^{th}$ frequency $k_{\lambda_n}$ is the regression coefficient for the $n^{th}$ frequency MFR Prediction MFR prediction models were developed on polypropylene granules samples previously characterized in the lab in accordance with ASTM D-1238-95 Procedure B. It has been found that it is necessary to create separate prediction models for homopolymers and copolymers.

Both the homopolymers and copolymer models had the following characteristics: (i) 271 $cm^{-1}$ to 1913 $cm^{-1}$ Raman shift, (ii) Developed by PCA/PLS and (iii) 4 Principal Components used in regression.

Figure 8:
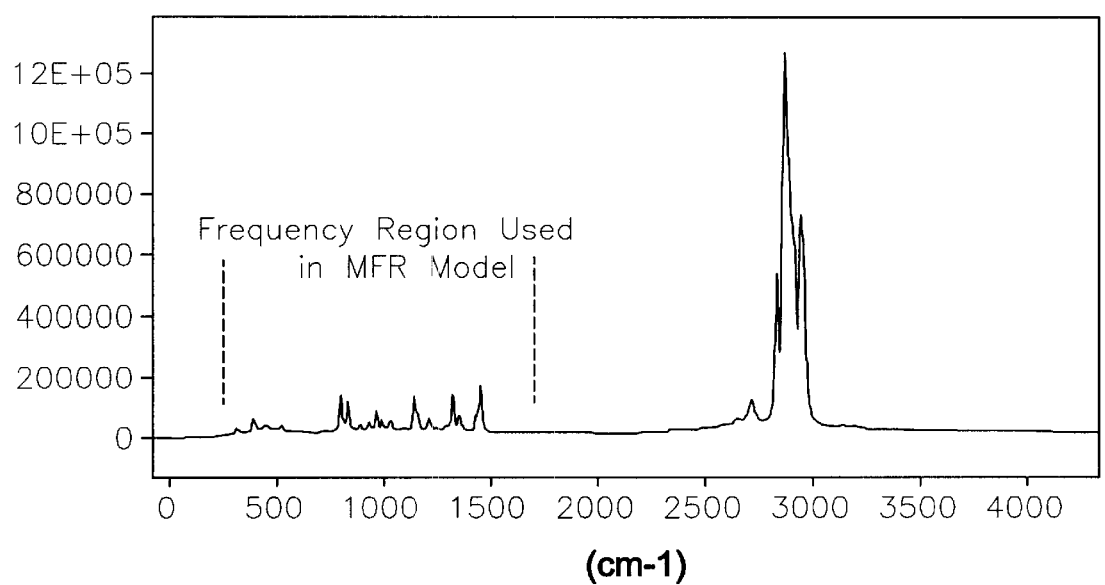
FIG. 8 is an illustration of Raman spectrum of polypropylene granules.

A Raman spectrum of polypropylene granules is shown below in FIG. 8. The frequency region used is illustrated on the plot.

Figure 9:
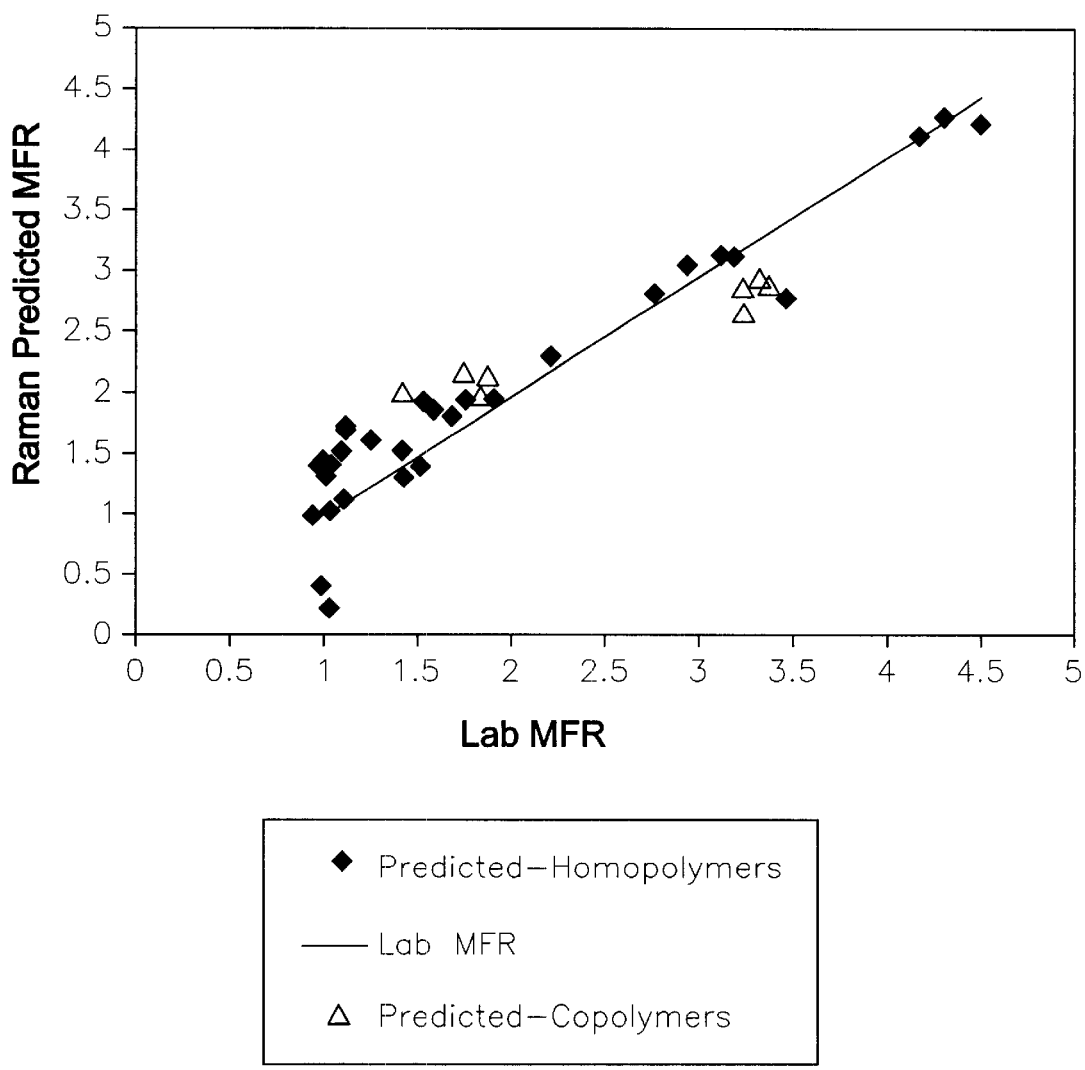
FIG. 9 is a plot of predicted MFR from Raman analysis vs. known MFR.

FIG. 9 illustrates a parity plot of Raman predicted MFR versus Lab MFR. The Standard Error of Cross Validation (SEV) is as follows:

Homo-polymers: 0.32 MFR

Copolymers: 0.41 MFR

As can be seen from the FIG. 9, spectroscopic analysis, and particularly Raman analysis can be used to predict MFR of polypropylene granules.

While the present invention has been described and illustrated by reference to particular embodiments, it will be appreciated by those of ordinary skill in the art that the invention lends itself to many different variations not illustrated herein. For these reasons, then, reference should be made solely to the appended claims for purposes of determining the true scope of the present invention.

Example 4
Raman Stectroscopy Sensitivity to Ethylene and 1-Hexene In a Simulated Slurry Loop Reactor The apparatus used in this simulation included the following major components:

A Kaiser HoloLab 5000 Raman Spectrometer

A NIR 785 nm/250 mW External Cavity Wavelength Stabilized Laser Diode

A imaging style optic, immersion probe with holographic probe head filter (FIG. 16), available from Kaiser Optical Systems, probe head model number HFPH-FC-S-785, immersion optic model number IMO-H-0.1

A fiber optic cable (4 fibers)

A personal computer with software to control spectrometer and collect/analyze spectra A stirred vessel with pressure measurement Experimental Procedure The experiment simulated slurry loop reactor conditions. Isopentane was substituted for the isobutane diluent for ease of handling. The vessel was first charged with isopentane and high-density polyethylene granules at a ratio similar to slurry loop reactor conditions. The vessel was then sealed and stirred throughout the experiment. To this slurry, aliquots of 1-hexene were added volumetrically. Spectra were collected before and after each addition of hexene.

After completing the 1-hexene additions, ethylene was then added to the slurry. Ethylene gas was fed to the vessel and quantitated by weighing the ethylene delivery cylinder. The ethylene gas pressurized the reaction vessel and was forced into solution by pressure and stirring agitation.

Figure 10:
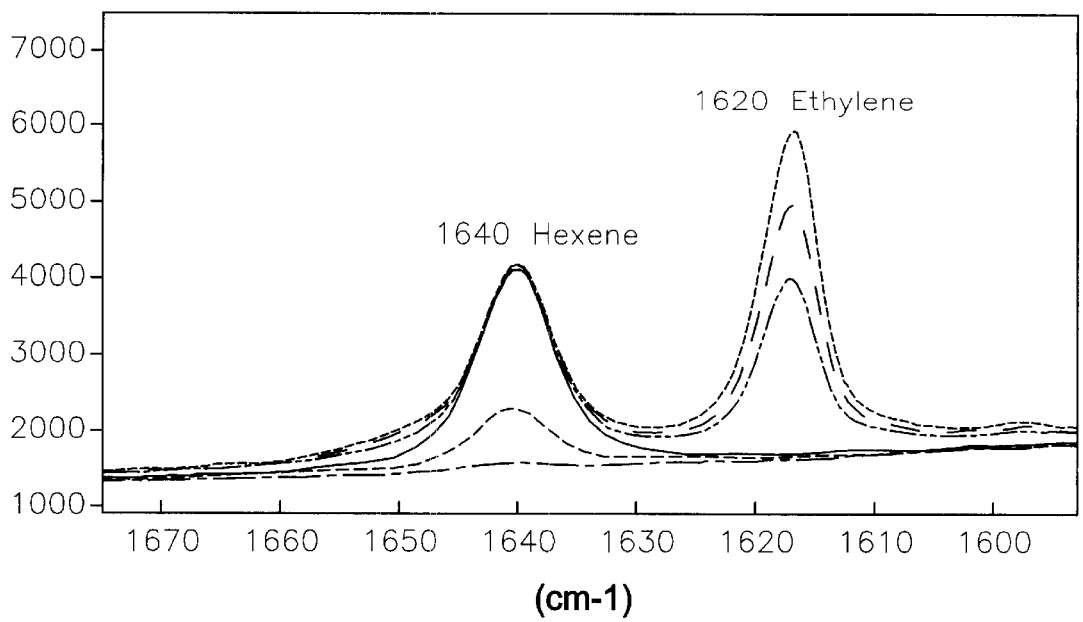
FIG. 10 is a plot of 1-hexene and ethylene Raman spectra.
Figure 11:
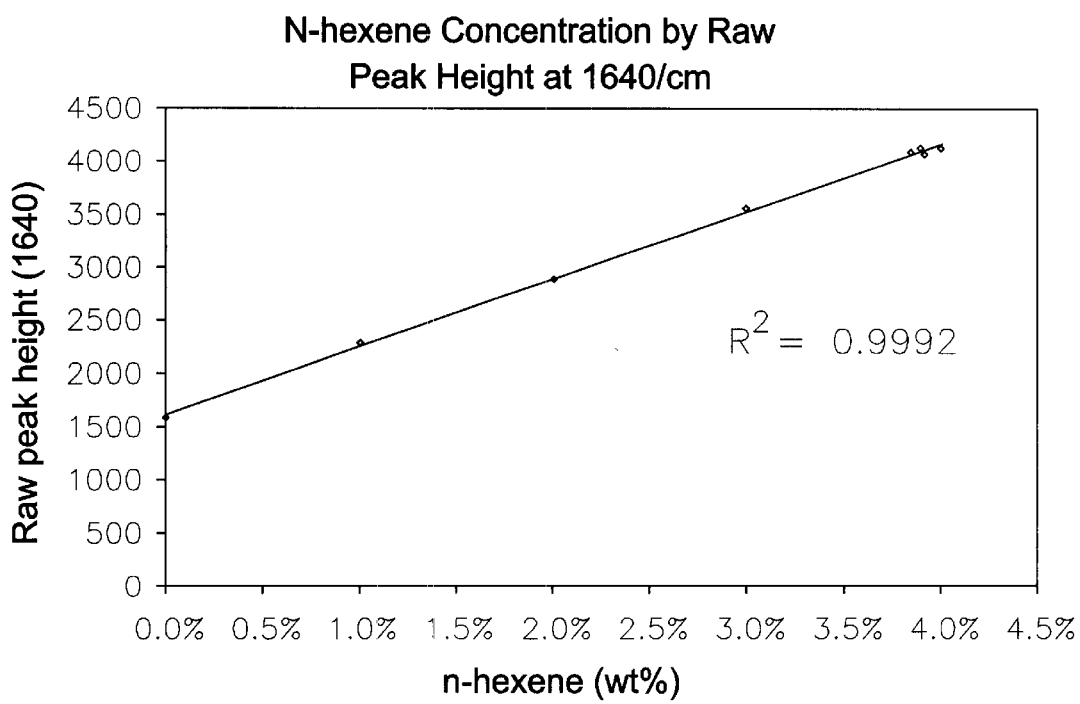
FIG. 11 is a plot of a relationship between the peak height of 1-hexene vs. 1-hexene concentration.

1-hexene exhibits a peak at a Raman shift of 1640 $cm^{-1}$. Ethylene exhibits a peak at a Raman shift of 1620 $cm^{-1}$. FIG. 10 illustrates the expanded spectra of these peaks in the slurry system. These peaks were used for the concentration measurements. The relationship between the peak height of the 1-hexene peak versus hexene concentration is shown in FIG. 11. The relationship between the peak height of the ethylene peak versus ethylene concentration is shown in FIG. 12.

Figure 12:
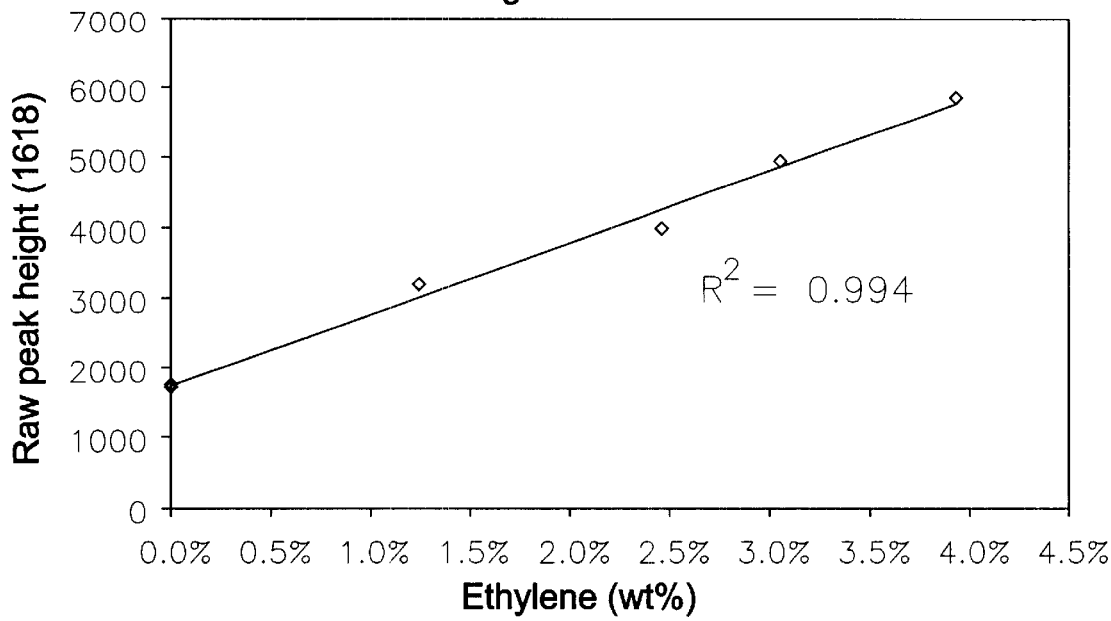
FIG. 12 is a plot of a relationship between the peak height of ethylene vs. ethylene concentration.

It is clear, in view of the FIGS. 10–12 and the above discussion, that ethylene and 1-hexene concentrations in a typical slurry loop reactor environment can be determined by Raman spectroscopy.

Figure 13:
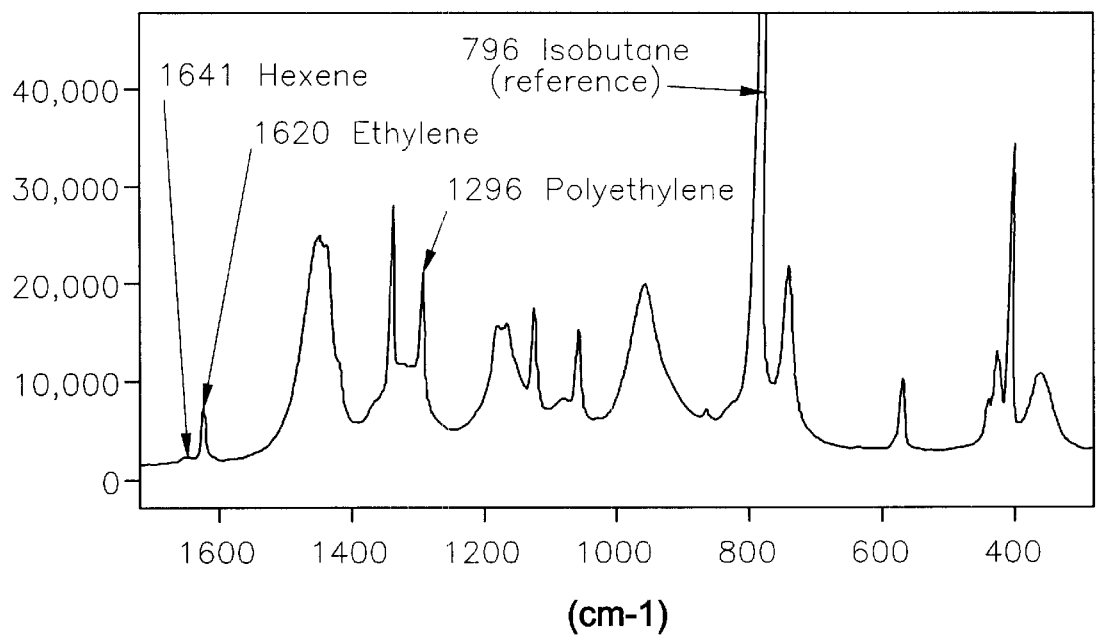
FIG. 13 is a plot of an expanded Raman spectra for the slurry described in Example 5.

Example 5
On-Line Validation of Raman Spectroscopy for Ethylene and Polyethylene Copolymer. Prophetic Example of Hexene Concentration Measurements The apparatus used in Example 5 included the following major components:
A Kaiser HoloLab 5000 Raman Spectrometer
A NIR 785 nm/250 mW External Cavity Wavelength Stabilized Laser Diode
A imaging style optic, immersion probe with holographic probe head filter, available from Kaiser Optical Systems, probe head model number HFPH-FC-S-785, immersion optic model number IMO-H-0.1
A 100 meter, jacketed fiber optic cable (4 fibers)
A personal computer with software to control spectrometer and collect/analyze spectra
A commercial slurry-loop, polyethylene reactor system Experimental Procedure The imaging probe was inserted directly into the slurry-loop reactor. Spectrum was collected as the reacting slurry flowed past the imaging probe tip. FIG. 13 exhibits the expanded Raman spectra collected from the slurry polyethylene copolymer reaction system.

Ethylene Concentration Measurements

Figure 14:
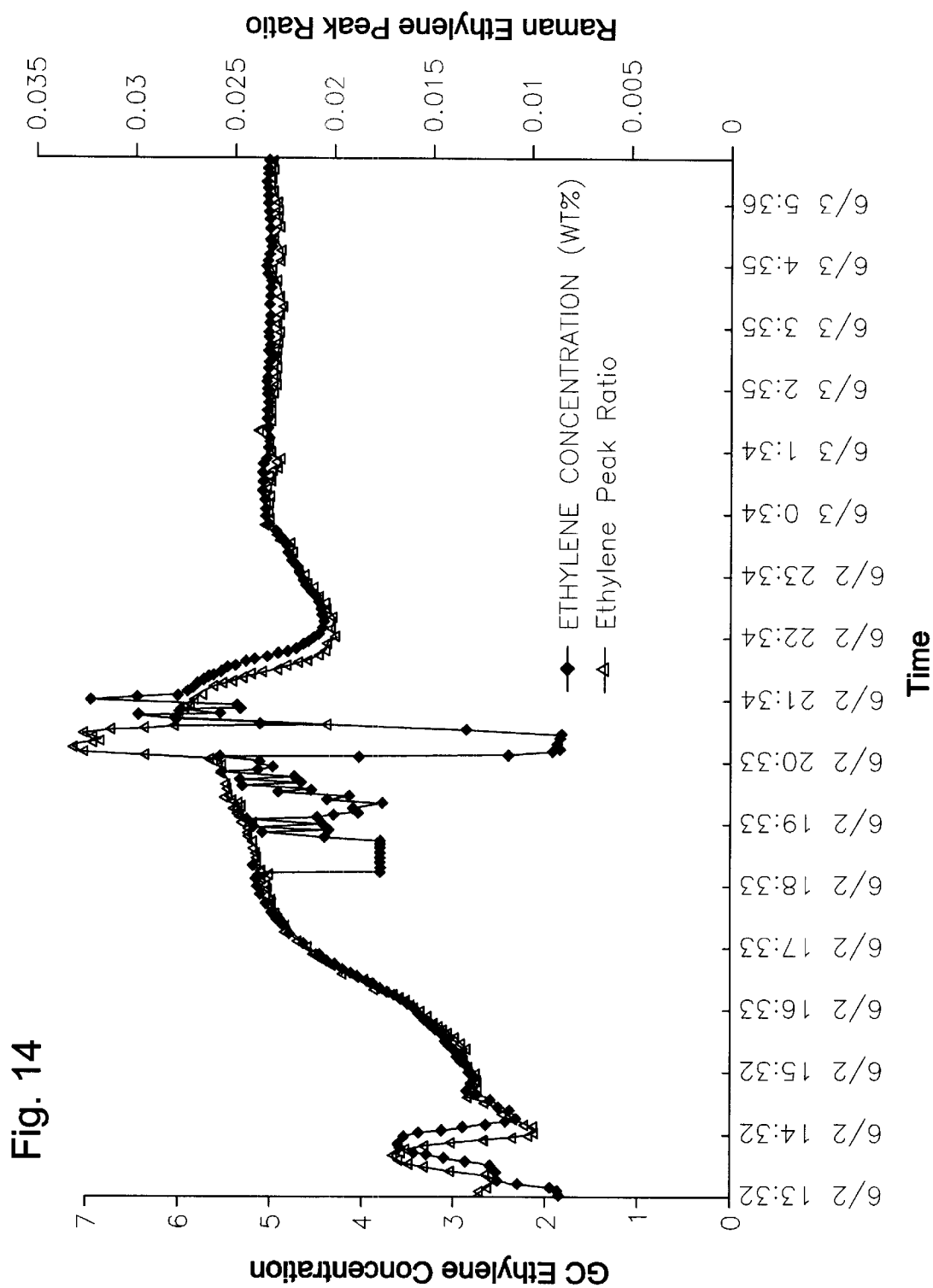
FIG. 14 is a plot of a relationship between the ethylene peak ratio and the gas chromatograph ethylene concentration measurement.

Ethylene concentrations were measured during a typical commercial polyethylene production run in the above commercial slurry loop reactor system operated at 550 psi, approximately 100 degrees C., with ethylene as the primary monomer and 1-hexene as the comonomer. For the analysis, the area of the known peak for the ethylene was divided by the area of an isolated isobutane peak (the reference peak). The result is the ethylene peak ratio. The peak ratio results were then compared to the results from the current ethylene measurement produced by a downstream gas chromatograph. FIG. 14 shows the relationship between the ethylene peak ratio and the gas chromatograph ethylene concentration measurement.

Based upon the peak ratio technique, the ethylene concentration prediction equation is as follows:

$$\text{Ethylene (wt \%)} = X^*(A_{1620}/A_{796}) + C$$

X=slope of linear regression
$A_n$=peak areas
C is a constant

It is clear, in view of FIGS. 13 and 14 and the above discussion, that the ethylene concentration may be predicted within acceptable variations within a commercial loop slurry reactor.

Hexene Concentration Measurements

Due to reaction conditions, the 1-hexene peak at a Raman shift of 1640 cm$^{-1}$ is generally not acceptable for the peak ratio technique. However, spectral modeling can offer a solution. For example, each spectra may be treated as an array of Raman shift (frequency) versus intensity values. The arrays of values from multiple spectra can be assembled to produce the matrix for chemometric analysis. Partial Components Analysis (PCA) and Partial Least Squares (PLS) can be used for the model creation. Using the information in the spectral range from 1580 cm$^{-1}$ to 1700 cm$^{-1}$, an effective model for hexene concentration (as indicated by the downstream gas chromatograph) can be produced.

Polyethylene Copolymer Concentration Measurements

Figure 15:
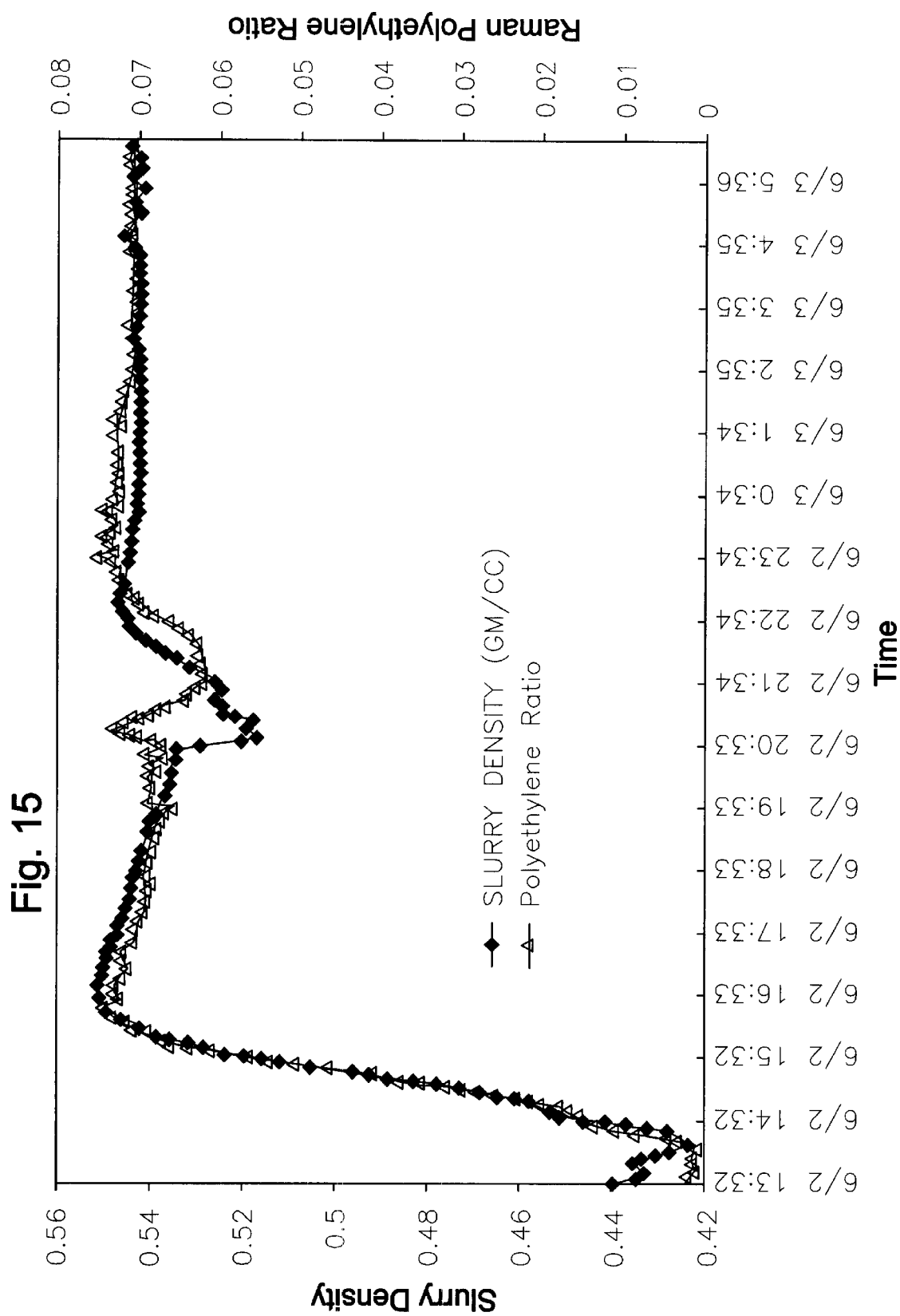
FIG. 15 is a plot of a correlation between the Raman polyethylene copolymer peak ratio and the slurry density/polyethylene copolymer concentration in the slurry loop reactor described in Example 5.

Polyethylene copolymer concentrations were measured during a typical commercial polyethylene production run in the above commercial slurry loop reactor system operated at 550 psi, approximately 100 degrees C., with ethylene as the primary monomer and 1-hexene as the comonomer. FIG. 15 illustrates a correlation between the Raman polyethylene copolymer peak ratio and the slurry density/polyethylene copolymer concentration in the commercial slurry loop system.

Based upon the peak ratio technique, the polyethylene copolymer concentration at the probe tip can be calculated. This prediction can be compared to the results of the reactor's on-line nuclear density analysis instrumentation. The prediction equation is as follows:

$$\text{Slurry Density (polymer concentration)} = X^*(A_{1295}/A_{796}) + C$$

X=slope of linear regression
$A_n$=peak areas
C is a constant

While the present invention has been described and illustrated by reference to particular embodiments, it will be appreciated by those of ordinary skill in the art that the invention lends itself to many different variations not illustrated herein. For these reasons, then, reference should be made solely to the appended claims for purposes of determining the true scope of the present invention.

Although the appendant claims have single appendencies in accordance with U.S. patent practice, each of the features in any of the appendant claims can be combined with each of the features of other appendant claims or the main claim.

What is claimed is:

1. A method of olefin polymerization in a slurry reactor containing reactor constituents having a liquid phase comprising:
   irradiating in-situ the reactor constituents;
   measuring scattered energy from the irradiated reactor constituents;
   determining a concentration of one or more reactor constituents; and
   metering a flow of at least one reactor constituent into the reactor in response to the determined concentration.

2. The method of claim 1 wherein the determining step is performed on at least one reactor constituent in the liquid phase.

3. The method of claim 2 wherein at least one of the reactor constituents in the liquid phase is hydrogen.

4. The method of claim 1 wherein the reactor constituents are circulated in the reactor.

5. A method of producing a polyolefin in a slurry reactor containing reactor constituents comprising:
   irradiating in-situ a slurry;
   measuring scattered energy from the slurry;
   determining from the measured scattered energy a concentration of one or more reactor constituents;
   comparing the concentration of one or more reactor constituents with one or more values that correlate to one or more selected physical properties of the polyolefin; and
   metering, in response to the comparing step, a flow of one or more reactor constituents into the reactor.

6. The method of claim 5 wherein the determining step is performed on at least one reactor constituent in a liquid phase of the slurry.

7. The method of claim 6 wherein at least one of the reactor constituents in the liquid phase is hydrogen.

8. The method of claim 5 wherein at least one of the selected physical properties of the polyolefin is a melt flow rate.

9. The method of claim 8 wherein the flow of one or more of the reactor constituents into the reactor is metered such that the polyolefin produced may be defined, in part, by a melt flow rate value within a selected melt flow rate range.

10. A method of producing a polyolefin in a reactor containing reactor constituents in liquid phase comprising:

irradiating in-situ the liquid phase;

measuring the frequencies scattered by the irradiated liquid phase;

determining from the measured frequencies a concentration of one or more reactor constituents;

comparing the concentration of one or more reactor constituents with one or more values that correlate to one or more selected physical properties of the polyolefin; and metering, in response to the correlating step, a flow of one or more reactor constituents into the reactor.

11. The method of claim 10 wherein one of the selected physical properties of the polyolefin is a melt flow rate value within a selected melt flow rate range and wherein the flow of one or more reactor constituents into the reactor is metered such that the polyolefin produced may be defined, in part, by a melt flow rate value within the melt flow rate range.

12. A method of producing a polyolefin in a slurry loop reactor containing reactor constituents, including hydrogen, in a liquid phase comprising:

irradiating in-situ the liquid phase;

measuring the frequency scattered by the hydrogen in the liquid phase;

determining the concentration of hydrogen in the liquid phase from the measured frequency;

comparing the concentration of hydrogen to a hydrogen concentration value that correlates to a melt flow rate value within a selected melt flow rate range; and metering, in response to the concentration of hydrogen measured, a flow of the hydrogen into the reactor such that the polyolefin produced may be defined, in part, by a melt flow rate value within the selected melt flow rate range.

13. A method of producing a polyolefin in a slurry reactor containing reactor constituents comprising a liquid phase and a solid phase forming a slurry reaction mixture, said method comprising:

irradiating in-situ at least a portion of the slurry reaction mixture;

measuring scattered energy from the slurry;

determining from the measured scattered energy a concentration of one or more reactor constituents;

controlling the flow of one or more reactor constituents into the reactor based on the concentration of one or more reactor constituents.

14. The method of claim 13 wherein the one or more reactor constituents in said determining step are the same as said one or more reactor constituents in the controlling step.

15. The method of claim 13 wherein at least one of the one or more reactor constituents in said determining step is different from said one or more reactor constituents in the controlling step.

16. The method of claim 13 wherein the concentration determined is that of ethylene in the liquid phase of a slurry reaction mixture.

17. The method of claim 13 wherein the measured concentration of ethylene and at least one other alpha-olefin copolymer in the liquid phase of a slurry reaction mixture are used to control the ratio of one or more reactor constituents into the reactor.

18. The method of claim 13 wherein the measured concentration of polymer in the solid phase of a slurry reaction mixture is used to control the flow of one or more reactor constituents into the reactor.

19. The method of claim 13 wherein the flow controlled is diluent.

* * * * *